United States Patent [19]

Zeilstra et al.

[11] 4,283,314

[45] Aug. 11, 1981

[54] RESIN COMPOSITION HAVING IMPROVED INTERNAL AND EXTERNAL LUBRICATING PROPERTIES EMPLOYING BRANCHED CHAIN HIGH MOLECULAR WEIGHT ESTER DERIVATIVES OF MONOCARBOXYLIC ACIDS

[75] Inventors: Jacobus J. Zeilstra, Wijnbergen; Willem J. de Klein, Dieren; Joannes D. Bik, Eerbeek; Jan Vis, Zevenaar, all of Netherlands

[73] Assignee: Akzona Incorporated, Asheville, N.C.

[21] Appl. No.: 88,582

[22] Filed: Oct. 26, 1979

[30] Foreign Application Priority Data

Oct. 26, 1978 [NL] Netherlands .................... 7810671

[51] Int. Cl.$^3$ .................... C08L 27/06; C08K 5/09; C08K 5/10
[52] U.S. Cl. .................... 260/23 AR; 260/23 XA; 260/23.7 H; 260/31.2 R; 260/31.6; 260/413
[58] Field of Search ....... 260/23 XA, 23 AR, 31.2 R, 260/31.6, 413, 23.7 H

[56] References Cited

U.S. PATENT DOCUMENTS

| | | | |
|---|---|---|---|
| 2,402,137 | 6/1946 | Hanford et al. | 560/247 |
| 2,823,216 | 2/1958 | Moote, Jr. et al. | 260/413 |
| 2,833,808 | 5/1958 | Brendlein | 260/465.3 |
| 3,213,149 | 10/1965 | Takahashi et al. | 260/658 |
| 3,462,503 | 8/1969 | Rieve | 260/658 |
| 3,471,579 | 10/1969 | Kubicek | 260/633 |
| 3,914,131 | 10/1975 | Hutchison | 106/268 |
| 3,927,051 | 12/1975 | Klein | 260/413 |
| 3,988,330 | 10/1976 | Foulks, Jr. et al. | 260/410.6 |
| 4,012,357 | 3/1977 | Foulks et al. | 260/31.2 R |
| 4,029,682 | 6/1977 | Foulks | 260/23 XA |
| 4,038,297 | 7/1977 | Rodenberg et al. | 260/23 XA |
| 4,065,418 | 12/1977 | Foulks et al. | 260/410.6 |
| 4,104,232 | 8/1978 | Inagaki et al. | 260/31.6 |
| 4,107,115 | 8/1978 | Foulks, Jr. | 260/23 XA |

FOREIGN PATENT DOCUMENTS

2548625  5/1976  Fed. Rep. of Germany.

*Primary Examiner*—Joseph L. Schofer
*Assistant Examiner*—Herbert J. Lilling
*Attorney, Agent, or Firm*—F. W. Young; Steven M. Odre; Robert F. Green

[57] ABSTRACT

The present disclosure relates to a resin composition having improved internal and external lubricating properties. The resin compositions comprises polyvinyl chloride or a copolymer thereof and one or more branched-chain monocarboxylic acids and/or derivatives thereof. Such derivatives are selected from the group consisting of (a) esters of phenols or aromatic, aliphatic or cycloaliphatic alcohols having at least 1 to 10 primary or secondary hydroxyl groups;
(b) amides of ammonia or aliphatic, cycloaliphatic or aromatic amines having at least 1 to 15 primary or secondary amino groups;
(c) salts of alkali metals or alkaline earth metals, amphoteric metals, heavy metals, of ammonium or of a compound containing a tertiary amino group. The branched-chain monocarboxylic acids are telomeric acids obtained by the free radical addition of 1 mole of acetic anhydride to at least three moles of hexene and/or higher olefins containing up to 30 or more carbon atoms ($C_{30+}$) in the presence of a trivalent manganese compound.

12 Claims, No Drawings

RESIN COMPOSITION HAVING IMPROVED INTERNAL AND EXTERNAL LUBRICATING PROPERTIES EMPLOYING BRANCHED CHAIN HIGH MOLECULAR WEIGHT ESTER DERIVATIVES OF MONOCARBOXYLIC ACIDS

The invention relates to a resin composition having improved internal and external lubricating properties, comprising polyvinyl chloride or a copolymer thereof and 0,1 to 5% by weight, calculated on the polymer, of one or more acids and/or derivatives thereof selected from the group consisting of
(a) esters of phenols or aromatic, aliphatic or cycloaliphatic alcohols having at least 1 to 10 primary or secondary hydroxyl groups;
(b) amides of aliphatic, cycloaliphatic or aromatic mono- or diamines having 1 or 2 primary or secondary amino groups;
(c) salts of alkali metals or alkaline earth metals, amphoteric metals, heavy metals, of ammonium or of a compound containing a tertiary amino group.

Resin compositions of the type indicated above are known from inter alia, the German Patent Specification 2 632 133. The lubricant used for polyvinyl chloride consists of mixtures of esters of branched-chain saturated monocarboxylic acids having a chain length of preferably 20 to 38 carbon atoms. Although with these products good results are obtained in a great number of compositions, there is still found to be need for both internal and external lubricants for polymers, more particularly polyvinyl chloride and copolymers thereof, having improved properties particularly with respect to clarity, without detracting from other properties such as colour and thermal stability. It has been found that resin compositions of a remarkably better quality can be obtained if for the preparation thereof use is made of lubricants prepared from acids having a product composition which entirely differs from the one described in the above-mentioned patent specification. The present invention provides a resin composition of the known type indicated above having improved physical properties. The invention consists in that into a resin composition of the above-mentioned known type there is incorporated a lubricant composition in which at least 40 percent by weight of the acid present as such or at least 40 percent by weight of the acid from which the derivatives are prepared has a branched-chain structure, and that at least 10 percent by weight thereof conforms to the formula

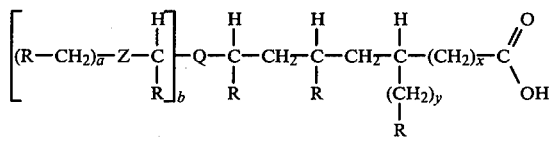

where
x=0, if y=2
or x=2, if y=0
R=CH$_3$(CH$_2$)$_n$, where n represents an integer of from 3 to 42;
b=0 or 1, where,
if b=0, Q represents a hydrogen atom, and
if b=1, Q represents a CH$_2$-group, and
a=0 or 1, where,
if a=0, Z represents a hydrogen atom, and
if a=1, Z represents a CH$_2$-group.

The acids of the above-mentioned formula can be obtained by reacting an α-olefin having 6 to 45 carbon atoms with acetic anhydride at a temperature in the range of 100° to 140° C. in the presence of a catalytic amount of an at least trivalent manganese compound.

The α-olefin may consist of a pure olefin fraction, such as 1-octene, or of a mixture of α-olefins having 6 to 45 carbon atoms. If use is made of a mixture of α-olefins, then the number for n in each separate R-radical may, independently of the other R-radicals in the first-mentioned structural formula of the acid, assume any value equal to the number of carbon atoms minus two of an α-olefin present in the mixture. The most favourable results are generally obtained at a reaction temperature in the range of 115° to 125° C. in the presence of manganic acetate as initiator.

To prevent oxidation of the substrate the concentration of the manganic acetate is preferably chosen between 10$^{-3}$ and 10$^{-10}$ moles per liter. The concentration of the olefin fraction is dependent on the desired percentage of branched-chain monocarboxylic acids in the reaction product, which percentage is partly determined by the olefin starting fraction. If use is made of an olefin starting fraction having not more than 20 carbon atoms, it is preferred—in view of the above-described field of application—that use should be made of a relatively high percentage of branched-chain acids. If, however, use is made of an olefin fraction having 20 to 45 carbon atoms, then more preference is found to be given to a mixture of monocarboxylic aids containing at least 70% by weight of the addition product of 1 mole of olefin to 1 mole of acetic acid. In all cases the reaction conditions will be so chosen that at least 10% by weight of the branched-chain acids conforms to the above-mentioned structural formula.

It should be added that also the U.S. Pat. Nos. 3,988,330, 4,012,357 and 4,029,682 mention is made of an addition reaction of α-olefins with a monocarboxylic acid under the influence of a radical initiator. The olefins always contain 22 or more carbon atoms. The reaction is carried out in the presence of a propionic acid or a higher carboxylic acid as solvent and inorganic or organic peroxides as radical initiator. Upon termination of the reaction the addition product is esterified with mono- and/or polyfunctional alcohols. A disadvantage to this process consists in that the conversion of the addition reaction is not higher than about 50 to 70%, which results in a higher percentage of olefin fraction in the endproduct which cannot be separated from it on a commercial scale. The resulting telomeric monocarboxylic acids not only strongly differ from the derivatives according to the invention as far as structure is concerned (exclusively α-branching) but also their product distribution is entirely different.

For the preparation of branched-chain monocarboxylic acids according to the first-mentioned formula, use is made of a molar ratio of converted olefin to manganic acetate of at least 4. It has been found that under these last-mentioned conditions the % by weight composition of the mixture of telomeric acids is for n≦17 only dependent on the molar ratio of α-olefin to manganic acetate and the concentration of α-olefin during the reaction. With a monocarboxylic acid obtained by reacting one α-olefin with acetic acid being indicated by R$_1$, a monocarboxylic acid obtained by reacting two α-olefins by R$_2$, a monocarboxylic acid obtained by reacting three α-olefins by R$_3$, etc., it is found that respectively before and after removal of the $R_1$-fraction the following is a typical example of a weight distribution that may be obtained.

| | before distillation weight % | after distillation weight % |
|---|---|---|
| $R_1$ | 30,7 | 0,3 |
| $R_2$ | 20,4 | 19,8 |
| $R_3$ | 21,4 | 33,6 |
| $R_4$ | 13,0 | 21,5 |
| $R_5$ | 9,4 | 15,9 |
| $R_6$ | 5,1 | 8,8 |

The structural formulae of $R_3$, $R_4$ and $R_5$ all correspond to the first-mentioned formula. $R_1$ is an unbranched acid of the formula $R(CH_2)_3COOH$ and for the above-mentioned reasons it is preferably removed from the reaction mixture in the case of esterification with an aliphatic alcohol having only one primary hydroxyl group. It will be obvious that in the case of esterification with a polyol $R_1$ also can partly be removed from the reaction mixture for instance by distillation. The $R_2$ fraction is formed by two acids of the formula:

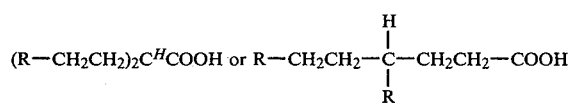

To a man skilled in the art it is obvious that especially when use is made of an olefin starting fraction having 30 or more carbon atoms, it is not possible in actual practice to separate the linear acids from the acids having a very high molecular weight and a high degree of telomerization. It has been found that the use of mixtures of these branched-chain and linear carboxylic acids and/or the derivatives thereof in resin compositions containing polyvinyl chloride or copolymers thereof lead to compositions having unexpectedly favourable properties, which remarkably favourably compare with the known compositions that only contain straight-chain fatty acids and/or the derivatives thereof.

The following is a typical example of a weight distribution of monocarboxylic acids obtained from a $C_{30+}$ olefin mixture.

| degree of telomerization (m) | weight % |
|---|---|
| m = 1 | 78,0 |
| m = 2 | 6,3 |
| m = 3 | 6,5 |
| m = 4 | 4,0 |
| m = 5 | 3,1 |
| m > 6 | 2,0 |

The commercially available olefin fractions having 20 to 45 carbon atoms are found to contain 60 to 80% by weight of α-olefins and for the rest predominantly consist of vinylidene compounds. The resulting carboxylic acids are γ-branched monocarboxylic acids, with the acid having the formula

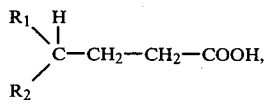

where $R_1$ and $R_2$ represent linear alkyl groups which together have the same number of carbon atoms as the group R.

Separation of these vinylidene groups-containing fractions from the α-olefins would give rise to so many technological problems that it must be considered impracticable for economic reasons. It has been found, however, that for most uses products having exceptionally good properties are obtained if besides the derivatives prepared from the branched-chain acids of the above formulae 40 to 60 percent by weight of the derivatives is prepared from linear aliphatic monocarboxylic acids, with the acid having the formula $RCH_2CH_2CH_2COOH$, where R represents a $CH_2(CH_2)_n$ group with n representing an integer from 17 to 42.

The proportion of derivatives of γ-branched carboxylic acids, with the acid having the formula:

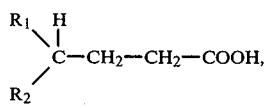

where $R_1$ and $R_2$ represent linear alkyl groups which together have the same number of carbon atoms as the group R. The above-described branched acids and derivatives thereof are excellently suitable to be incorporated as internal and/or external lubricants into polyvinyl chloride or copolymers of polyvinyl chloride.

It has been found that many of the acids and/or derivatives thereof with n representing an integer from 3 to 17 provide liquid lubricant formulations. Especially the highly branched acids and/or derivatives thereof show an external lubricating effect and an unexpected degree of clarity in PVC compositions.

The best results are obtained if at least 30 percent by weight of the acid present as such, or at least 30 percent by weight of the acid from which the derivatives are prepared conforms to the first-mentioned formula. Particularly the esters are found to have attractive properties for said use. Moreover, the esters of these acids are often liquid at room temperature, in which state they can be readily processed. On the other hand, because of their high molecular weight they have a relatively low volatility and little tendency to migrate, so that the lubricant will less readily exude from the polymer phase. For the preparation of external lubricants for polyvinyl chloride and copolymers thereof of the type of montanic acid and/or derivatives thereof it is preferred that use should be made of derivatives of branched acids of the first-mentioned formula where n represents an integer from 17 to 42.

The ester derivatives in the resin compositions of the present invention are derived from the branched-chain and, possibly, straight-chain acids of the above formulae and phenols or aromatic, aliphatic or cycloaliphatic alcohols having at least 1 to 10 primary or secondary hydroxyl groups.

Suitable phenols that may be used for the preparation of the ester derivatives to be used in the compositions according to the invention include phenol, cresol, xylenol, mesitol, durenol, thymol, naphthol, resorcinol, hydroquinone, bisphenols such as 4,4'-oxydiphenol, 4,4'-isopropylidene diphenol, 4,4'-methylene diphenol and biphenyl-4,4'-diol. They may optionally be substituted with, for instance, alkyl or alkoxy groups or halogen.

Suitable aromatic hydroxyl compounds include benzyl alcohol, tolyl alcohol (=methylphenyl carbinol), phenethyl alcohol, salicyl alcohol, 2-naphthalene ethanol, phenylpropyl alcohol and cinnamyl alcohol.

Suitable aliphatic or cycloaliphatic alcohols include monohydric alcohols, di- en higher polyhydric alcohols and ether alcohols, which may be mono- or polyfunctional. Optionally, they may contain ethylenically unsaturated groups or other substituents, such as alkyl, alkoxy, halogen or heterocyclic groups such as in furfuryl alcohol. They may contain 1 to 60 or more carbon atoms. Suitable ester derivatives are obtained by making use of methanol, ethanol, n-propanol, isopropanol, n-butanol, t-butanol, iso-amylalcohol, n-hexanol, cyclohexanol, 2-cyclohexene-1-ol, 2-ethylhexanol, n-octanol, isodecanol, capryl alcohol, lauryl alcohol, myristyl alcohol, cetyl alcohol, stearyl alcohol and oxo alcohols such as tridecyl alcohol, which substantially consists of tetramethyl-1-nonanol and hexadecyl alcohol which is made up of a composite mixture of primary alcohols and may be characterized as 2,2-dialkyl ethanols in which the alkyl groups substantially consist of methyl-branched C$_6$ and C$_8$ radicals. As examples of aliphatic polyols suitable to be used for the preparation of the ester derivatives may be mentioned: ethylene glycol, 1,2-propylene glycol, 1,3-propylene glycol, 1,2-butanediol, 1,4-butanediol, 1,5-pentanediol, 3-methyl-1,5-pentane diol, 3-methyl-1,5-pentane diol, 2,3-dimethyl-2,3-butanediol, trimethylol propane, mannitol, sorbitol, glycerol and pentaerythritol. The preparation of the novel ester derivatives according to the invention also may be carried out with the use of ether alcohols. The ether alcohols may be monofunctional or polyfunctional and contain 2 to 8 condensed polyol units. Suitable ether alcohols include diethylene glycol, triethylene glycol, tetraethylene glycol, diethylene glycol monomethyl ether, diethylene glycol monoethyl ether, triethylene glycol monomethyl ether, butoxyethanol, butylene glycol monobutyl ether, dipentaerythritol, tripentaerythritol, tetrapentaerythritol, diglycerol, tetraglycerol, pentaglycerol, hexaglycerol, heptaglycerol and octaglycerol. Also suitable compounds have been found to be mono- or diesters of the polyalkylene oxide glycols having 2 to 50 alkylene oxide units each containing 2 to 4 carbon atoms. Examples thereof include polyethylene oxide glycol having a molecular weight of 500 to 2000 and polytetrahydrofuran having a molecular weight of 600 to 2000. For use as lubricant in polymers or resin compositions not all free hydroxyl groups need be esterified. Also partially esterified polyols are within the scope of the present invention. It is preferred that at least 50% of the available hydroxyl groups are converted into esters.

It has been found that resin compositions having remarkably good lubricating properties are obtained if use is made of esters of aliphatic polyols and ether polyols having 2 to 12 carbon atoms and 2 to 8 primary or secondary hydroxyl groups. Special mention should be made in this respect of esters derived from ethylene glycol, neopentyl glycol, pentaerythritol, dipentaerythritol, tripentaerythritol, glycerol, and/or di-, tri-, and/or tetraglycerol. The acid number of these esters is preferably lower than 30 and the hydroxyl number lower than 40.

It will be clear that also mixtures of acids and/or esters derived from at least one acid of the first-mentioned formula and some other branched or non-branched acid may be suitable for use in the polymer compositions according to the invention. In the preparation of the acids of the first-mentioned formula also other branched and non-branched fatty acids are obtained. It has been found that the presence of esters derived from a polyol having at least 2 to 10 primary or secondary hydroxyl groups, at least one branched-chain acid having the first-mentioned formula and a branched acid having the formula:

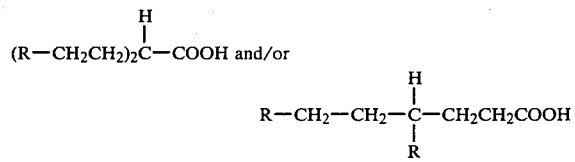

where R has the same meaning as in the first mentioned formula, leads to obtaining products having particularly good lubricating properties. Besides, it has been found that also esters derived from a polyol having at least 2 to 10 primary or secondary hydroxyl groups, at least one branched-chain acid of the first-mentioned formula and an unbranched aliphatic monocarboxylic acid having 7 to 47 carbon atoms are very suitable for use in the polymer compositions according to the invention. What has been said above about the esters of polyalcohols applies, mutatis mutandis, to all derivatives of the present invention prepared from a poly-functional compound such as a polyamine or a polyisocyanate.

It will further be clear that not only the monocarboxylic acids of the first-mentioned formula and/or their derivatives of monofunctional alcohols, amines, isocyanates and the like, but also mixtures containing other branched or non-branched monocarboxylic acids and/or the derivatives thereof may be used as lubricant in PVC-containing resin compositions. For a man skilled in the art it will not be difficult, on the basis of the physical properties of the separate properties, to establish whether or not it is possible to use mixtures also containing other branched or non-branched monocarboxylic acids and/or derivatives thereof.

The esters according to the invention are prepared by esterifying an alcohol or a mixture of alcohols in a manner known in itself, in which process per alcohol at least one branched-chain acid of the first-mentioned formula is present. As indicated above, also other branched or non-branched acids may be present. The esterification reaction may be carried out in the usual manner. The reaction mixture is heated to a temperature of 100° to 300° C. in the presence or not of a catalyst, the water evolved in the reaction being discharged. The esterification is usually carried out at a temperature in the range of 140° to 280° C. Optionally, use may be made of an esterification catalyst. This may be an acid such as sulphuric acid, phosphoric acid, alkylsulphonic acids and arylsulphonic acids such as p-toluene sulphonic acid and methane sulphonic acid, and a variety of metal compounds such as dibutyl tin oxide, tetrabutyl titanate, zinc acetate, stannooxalate, iron oxide, ferristearate, manganostearate, cobalt (II) stearate and manganoacetate.

The catalyst is usually employed in an amount of 0,1 to 1% by weight, based on the reaction mixture. Optionally, use may be made of an inert thinner which together with water forms an azeotrope, such as benzene, toluene or xylene.

In the process use is generally made of stoichiometric amounts of acid and alcohol, although in the esterification with the more volatile alcohols the latter also may be used in excess. By the end of the reaction the excess is removed from the reaction mixture by distillation. Esterification may take place at atmospheric pressure, but it is also possible to have it carried out at reduced pressure (2–50 mm Hg). Under such conditions the excess alcohol and water can readily be removed upon completion of the reaction. The resulting esters can as a rule directly be used for one of the above purposes. Under some circumstances, however, it may be advisable also to apply a purification step, for instance by treating the compositions with bleaching earth, ozone, peroxide, hyprochlorite or some other suitable bleaching agent. The preparation also may include a treatment with active carbon.

The esters derived from aliphatic monoalcohols having 1 to 8 carbon atoms and a mono-carboxylic acid of the first-mentioned formula, where n=3 to 9, may be purified for instance by distillation.

For the preparation of diesters of acids having the first-mentioned formula it is of advantage to make use of the epoxides instead of the corresponding alcohols. Particularly if instead of the telomeric acids the corresponding anhydrides are used, the reaction in the presence of 1 mole percent of a tetraalkyl ammonium bromide such as tetrabutyl ammonium bromide proceeds very rapidly. It will be evident that in the esterification use may be made of pure telomeric acids or of a mixture thereof with other acids, such as acetic acid, lauric acid or oleic acid. As examples of suitable epoxides for the preparation of diesters may be mentioned ethylene oxide, propylene oxide, the epoxides derived from $\alpha$-olefins having 3 to 45 carbon atoms, the epoxides derived from other unsaturated alkenes, esters of 2,3-epoxy-1, propanol, epoxidized natural oils, such as epoxidized soy bean oil, cyclic epoxides and di-epoxides. In addition to being suitable for the preparation of diesters, the epoxides may be used for the preparation of esters having a high hydroxyl number. The epoxides may also be used to reduce the hydroxyl number of esters.

Besides the above-mentioned esters also soaps (salts) and mixtures of esters and soaps (ester-soaps) prepared from an acid according to the first-mentioned formula are excellently suitable to be used in lubricating compositions of, more particularly, polyvinyl chloride and copolymers thereof. Useful soaps and ester-soaps prepared from the above-described higher molecular weight acids include those obtained using alkali metals, alkaline earth metals, amphoteric metals and heavy metals. Illustrative metals include: lithium, sodium, potassium, beryllium, magnesium, calcium, strontium, barium, copper, silver, zinc, cadmium, mercury, aluminium, iron, nickel, cobalt and the like. Especially useful metallic soaps for use in polymers are prepared from the metals of lithium, calcium, barium, magnesium, zinc, lead, cadmium or tin and mixtures thereof. In applications where use is made of montanic acid soaps said soaps may be replaced by soaps which are obtained from the acids according to the first-mentioned formula, where n represents an integer of from 17 to 42. Metal contents of resins containing these products may range from low levels, about 0.1 weight % with certain ester-soaps, to as high as 15 wt. % or more for overbased formulations with the soaps of some of the heavier metals. The salts (soaps) are prepared in a known manner by the wet route of precipitation or by the dry route of melting. The preparation of the insoluble soaps derived from lower olefins may be effected by a double decomposition reaction in which first the acid is dissolved in hot water and subsequently neutralized with a sodium hydroxide solution in order to obtain the soluble sodium salt. Next, a solution of the respective heavy metal is slowly added with stirring. The insoluble metal salt instantaneously precipitates from the solution and is isolated therefrom by filtration.

This reaction is usually carried out at a temperature in the range of 50° to 90° C. and can only be applied in the preparation of soaps that give a watersoluble sodium salt. This is generally the case if n=3 to 7. In the preparation of the soaps use will generally be made of the direct procedure of heating the acid in the presence of a metal oxide, hydroxide or weakly acid salt.

Mixtures of esters and soaps are obtained by partial saponification of the acid, that is by reacting the carboxyl groups of the branched-chain acids with a metal compound and an aliphatic hydroxyl compound having 1 to 40, and preferably 1 to 12 carbon atoms and 1 to 10 primary or secondary hydroxyl groups. The reaction of the metal compound and the aliphatic hydroxyl compound with a mixture of the high molecular weight monocarboxylic acids may be carried out stepwise or in a single step. The monocarboxylic acids may first be contacted with the desired amount of metal compound in order partially to neutralize the acid and subsequently esterifying the remaining carboxyl groups by reaction with the hydroxyl compound.

Alternatively, first a part of the carboxyl groups may be esterified and the remaining part of the carboxyl groups be neutralized with the metal compound. It is preferred, however, to apply the single-step procedure. Esterification is effected under the same conditions as given above for the preparation of pure esters.

Not only salts of metals and tertiary amines such as triethylamine, pyridine and quinoline, but also amides of ammonia or of aliphatic, cycloaliphatic or aromatic amines and a branched-chain acid of the first-mentioned formula are excellently suitable for use as internal and/or external lubricants in the resin compositions of the present invention. Suitable amines from which the amides are derived include: methylamine, ethylene diamine, butylamine, hexamethylene-1,6-diamine, p-phenylene diamine and 1,4-cyclohexyl diamine, methylethyl amine and 2-(N-methylamino) heptane. Also suitable for use are substituted amines, such as ethanol amine and butanol amine.

The preparation may be carried out by first converting the acid into the acid chloride by reacting it with, for instance, thionyl chloride or phosphorus trichloride or phosphorus pentachloride, after which the acid chloride is added to the amine in the presence of a base such as an aqueous sodium hydroxide solution or pyridine. The preparation usually takes place by a direct reaction of the amine with the acid, the anhydride or the ester.

Another attractive method of preparing the amides of the branched-chain acids according to the first-mentioned formula is characterized by direct reaction of the acid or mixture of acids and the equivalents amount of 1 or more isocyanate groups-containing compounds or mixtures thereof.

The use of isocyanate groups-containing compounds has the additional advantage that the reaction proceeds at a higher speed and as byproduct only the readily isolated carbon dioxide is formed.

An important advantage of the novel amide compounds according to the present invention over the known compounds described in, for instance, the German Patent Specification No. 2 460 235 inter alia consists in that the compounds according to the invention will less readily show a tendency to exude.

The isocyanates to be used in the preparation of the present compounds may be of an aliphatic or aromatic character. If few or no coloured products are desired, then it is preferred to use aliphatic isocyanates. Preference is further given to isocyanates of the general formula A—$R_1$—NCO, where $R_1$ represents a (cyclo) aliphatic hydrocarbon having at least 6 carbon atoms, a phenyl group or naphthyl group, which groups may be substituted or not with one or more lower alkyl groups having 1 to 8, and preferably 1 to 6 carbon atoms, lower alkoxy groups having 1 to 8, and preferably 1 to 6 carbon atoms, aryl, for instance phenyl, and halogen such as chlorine or bromine, and A represents a —NCO group, or a —$R_2$—($CH_2$—$R_3$—NCO$)_n$ $R_4$ NCO group, where $R_2$ has the meaning of a simple bond or an aliphatic hydrocarbon group having 1 to 4 carbon atoms, n is equal to 0 or higher, and $R_3$ and $R_4$ may be the same or different and may or may not have the same meaning as $R_1$.

As examples of suitable monoisocyanates may be mentioned ethyl isocyanate, hexyl isocyanate, 2-ethylhexyl isocyanate, butyl isocyanate, stearyl isocyanate. As examples of diisocyanates which can be defined by the formula OCNRNCO, where R represents a divalent aliphatic, cycloaliphatic or aromatic group, may be mentioned:
hexamethylene diisocyanate;
dimethyl hexamethylene diisocyanate;
trimethyl hexamethylene diisocyanate;
metaxylylene diisocyanate;
paraxylylene diisocyanate;
tetramethylene diisocyanate.
In the case where R represents an aromatic group, it may be substituted with a halogen, a lower alkyl or a lower alkoxy group.

As examples of such diisocyanates may be mentioned:
1-chloro-2,4-phenylene diisocyanate;
2,4-toluene diisocyanate;
a mixture of 2,4-toluene diisocyanate and 2,6-toluene diisocyanate;
tetramethylphenylene diisocyanate;
diphenylmethane-4,4'-diisocyanate;
metaphenylene diisocyanate;
paraphenylene diisocyanate;
1,5-naphthalene diisocyanate;
biphenyl-4,4'-diisocyanate;
diphenylmethane-4,4'-diisocyanate;
4,4'-isopropylidene diphenyl isocyanate;
benzophenone-4,4'-diisocyanate;
diphenylether diisocyanate or diphenylsulphide diisocyanate;
3,3'-dimethyldiphenyl-4,4'-diisocyanate;
3,3'-dimethoxydiphenyl-4,4'-diisocyanate;
3,3'-dichlorodiphenyl-4,4'-diisocyanate;
benzofuran-2,7-diisocyanate.

Examples of diisocyanates having a cycloaliphatic group include isophoron diisocyanate, dicyclohexyl methane diisocyanate and 1,4-cyclohexane diisocyanate.

The temperature at which the reaction takes place between the monocarboxylic acid and the isocyanate should be established experimentally. It will generally be in the range of 40° to 250° C. The reaction can be followed by the amount of carbon dioxide evolved in the process.

The above-described branched-chain acids and the derivatives thereof are excellently suitable to serve as internal and/or external lubricants in polyvinyl chloride or copolymers of polyvinyl chloride. By polyvinyl chloride and copolymers of polyvinyl chloride are to be understood here all possible types of homopolymers of vinyl chloride and post-chlorinated polyvinyl chloride, and also copolymers with vinyl chloride as the most important constituent, and a small amount of other copolymerizable monomers, such as copolymers of vinyl chloride and vinyl acetate, copolymers of vinyl chloride and vinylidene chloride, copolymers of vinyl chloride and acrylonitrile, and copolymers of vinyl chloride and maleic or fumaric esters and copolymers of vinyl chloride and styrene, and also mixtures containing a high percentage of polyvinyl chloride resin and a small percentage of some other synthetic resin, such as chlorinated polyethylene, copolymers of acrylonitrile, butadiene and styrene.

The lubricants can be incorporated into the polyvinyl chloride or copolymers thereof in a usual manner. It may be done by mixing on a roll or in a mixer of the Banbury type. Alternatively, the lubricant may be dissolved or dispersed in a suitable solvent. The lubricant may be added along with other compounding ingredients such as stabilizers fillers and plasticizers or it may be added in a separate step. The physical properties of the formulated resin composition may be considerably varied by changing the amount and the nature of the constituents to be incorporated therein without detracting from the lubricating properties of the present lubricants.

The invention will be further described in but not limited by the following examples.

EXAMPLE I

A slurry made up of 17,4 g of manganese (III) acetate in 100 ml of acetic anhydride and 84 g (0,6 moles) of 1-decene was slowly added, with stirring, over a period of 1,5 to 5 hours in an atmosphere of nitrogen, to a previously provided mixture of 900 ml (9,5 moles) of acetic anhydride and 42 g (0,3 moles) of 1-decene. The reaction temperature was 125° C., and the stirring speed 800 revolutions per minute. Upon completion of the reaction the mixture was cooled to room temperature and filtered to remove the manganese (II) acetate formed. Subsequently, acetic anhydride, acetic acid formed and unconverted 1-decene were distilled off. To the residue there were added 200 ml of acetic acid and 25 ml of water and the mixture was heated for 1 hour to 100° C., with vigorous stirring. Then the acetic acid-water mixture was distilled off, followed by removing the $R_1$ fraction (=lauric acid) in a rotary vacuum evaporator of the Leybold KDL-4 type under the following conditions:

| | |
|---|---|
| Sleeve temperature | 118° C. |
| cold finger | 25° C. |
| metering vessel | 40° C. |
| pressure | $10^{-3}$ mm Hg |

-continued

| feed rate | 400 ml/hour |
|---|---|

After distillation the telomeric acids had the following compositional analysis:

| | weight % |
|---|---|
| $R_1$ | 0,3 |
| $R_2$ | 19,8 |
| $R_3$ | 33,6 |
| $R_4$ | 21,5 |
| $R_5$ | 15,9 |
| $R \geqq 6$ | 8,8 |

The acid number of the heavy fraction was found to be 109,3. 75 g of n-butanol and 50 g of the resulting telomeric acids were intermixed, after which 1 g of manganese (II) acetate was added to the mixture. After 4 hours heating at 280° C. in an autoclave under nitrogen the reaction mixture was cooled and the excess of n-butanol distilled off. The residue was introduced into ether, after which the catalyst was washed out with water.

The product distribution of the resulting butanol ester mixture was as follows:

| | wt % |
|---|---|
| $R_1$ | 0,3 |
| $R_2$ | 18,6 |
| $R_3$ | 33,7 |
| $R_4$ | 22,0 |
| $R_5$ | 16,4 |
| $R \geqq 6$ | 9,0 |

This mixture was incorporated into a hard polyvinyl chloride (PVC) formulation and compared with a few commercially available lubricants.

Product A = butane diol ester of montanic acid, 40% of which is saponified with calcium.

Product B = a mixture of tridecyl stearate and equal parts by weight of glycerol monooleate and pentaerythritol adipate/oleate Product C = glycerol mono-ricinoleate (a typical internal lubricant)

Product D = the above-mentioned butanol ester mixture.

Product E = the above-mentioned mixture of telomeric acids.

Use was made of the following test methods:

1. Brabender test for determining the rheological properties, the most important parameters being the gelation time, and the melt viscosity (torque upon gelation and the torque 5 minutes after gelation).

2. High speed mill test for studying the behaviour during processing, such as calendering.

The polymer is observed for sticking to the roll (stick time) and change in colour both at elevated temperature and at high speeds.

3. Clarity. This property was determined by moulding formulated PVC mixtures into plates about 1 mm thick and subsequently visually evaluating the clarity.

Procedure

Each formulation was intensively mixed on a Papenmeier mixer. Part of the mixture was used for testing in the Brabender Plasticorder under the following conditions:

| temperature | 170° C. |
|---|---|
| speed | 30 revolutions per minute |
| sample weight | 30 g |

Another part of the mixture was thoroughly mixed on a roll mill at 160° C. until the mixture was entirely homogeneous. The required samples were cut out of a rolled sheet about 2 mm thick.

The samples were heated in an air circulation oven at 185° C., from which they were removed at 10 minute intervals, after which they were visually evaluated for change in colour. This colour change was taken as a measure of the decomposition rate of the PVC compound. The results of the experiments are combined in the following table and rated from 1 to 5, where 3 = slow gradual change;
4 = good early colour, rapid colour change;
5 = good
1 = poor
2 = fairly rapid gradual degradation.

The formulation of the polyvinyl chloride use in this example was as follows:

| | parts by weight |
|---|---|
| PVC-suspension polymer | 100 |
| dibutyl tin-bis-lauryl mercaptan | 1,0 |
| mixture of monobutyl tin-tris (isooctylthioglycolate) and dibutyl tin bis(isooctylthioglycolate | 1,0 |
| epoxidized soybean oil | |
| phenolic antioxidant | |
| lubricant | 0,1 0,3 0,5 1,0 |

1. Brabender test

| lubricant (parts by weight) | 0,1 | 0,3 | 0,5 | 1,0 |
|---|---|---|---|---|
| type of lubricant | gelation time(s) | | | |
| control | 85 | 85 | 85 | 85 |
| product A | 100 | 270 | 330 | 890 |
| product B | 60 | 70 | 105 | 110 |
| product C | 60 | 55 | 55 | 55 |
| product D (invention) | 50 | 130 | 190 | — |
| product E (invention) | 95 | 150 | 250 | no gelation |

| lubricant (parts by weight) | 0,1 | 0,3 | 0,5 | 1,0 |
|---|---|---|---|---|
| type of lubricant | torque upon gelation | | | |
| control | 650 | 650 | 650 | 650 |
| product A | 640 | 570 | 540 | 480 |
| product B | 660 | 630 | 610 | 600 |
| product C | 640 | 660 | 600 | 530 |
| product D (invention) | 620 | 600 | 600 | — |
| product E (invention) | 650 | 620 | 560 | — |

2. High speed mill test

| lubricant (parts by weight) | 0,1 | 0,3 | 0,5 |
|---|---|---|---|
| type of lubricant | time (min) after which polymer sticks to roll | | |
| control | 10 | 10 | 10 |
| product A | 35 | 40 | 40 |
| product B | 15 | 35 | 35 |
| product C | — | 10 | 5 |
| product D | 10 | 5 | 15 |
| product E | 15 | 15 | 40 |

The above test results show that the product D according to the invention may best considered to be an internal lubricant. This was also confirmed by the test for clarity and the oven test. At higher concentrations the product E was found to be the most suitable external lubricant.

3. Clarity and thermal stability

| type of lubricant | lubricant 0,1 | 0,3 | 0,5 | 0,1 | 0,3 | 0,5 |
|---|---|---|---|---|---|---|
| | clarity | | | thermal stability | | |
| control | good | good | good | 3 | 3 | 3 |
| product A | excellent | poor | poor | 3 | 4 | 3 |
| product B | good | poor | — | 3 | 4 | 4 |
| product C | good | good | poor | 3 | 4 | 3 |
| product D | excellent | excellent | good | 3 | 4 | 3 |
| product E | good | poor | poor | 3 | 4 | 3 |

EXAMPLE II

In this example a number of commercial lubricants for PVC are compared with the ethylene glycol ester mixture of branched-chain monocarboxylic acids according to the invention, where n represents an integer of from 19 to 23. The formulation of the PVC used in this example was as follows:

| | parts by weight |
|---|---|
| PVC suspension polymer | 100 |
| dibutyl tin bisisooctyl thioglycolate | 2 |
| lubricant | 0,1 0,3 0,5 |

The test program was carried out as indicated in Example I.

Product A = glycerol monoricinoleate
Product B = paraffin wax
Product C = 1,3-butane diol ester of montanic acid, 40% by weight of it being saponified with calcium.
Product D = the ethylene glycol ester mixture according to the invention.

1. Brabender test

| type of lubricant | parts by weight | gelation time (s) | torque on gelation | torque 5 min after gelation |
|---|---|---|---|---|
| control | 0 | 85 | 650 | 450 |
| product A | 0,5 | 55 | 650 | 450 |
| product B | 0,5 | 185 | 600 | 450 |
| product C | 0,1 | 100 | 640 | 460 |
| | 0,3 | 270 | 570 | 460 |
| | 0,5 | 330 | 540 | 460 |
| product D (according to invention) | 0,5 | 160 | 610 | 450 |

2. High speed mill test and clarity

| type of lubricant | parts by weight | time (min) after which polymer sticks to roll | clarity 2 mm thick PVC-slice |
|---|---|---|---|
| control | 0 | 10 | excellent |
| product A | 0,5 | 5 | good |
| product B | 0,5 | 10 | moderate |
| product C | 0,1 | 35 | good |
| | 0,3 | >40 | moderate |
| | 0,5 | >40 | moderate |

-continued

2. High speed mill test and clarity

| type of lubricant | parts by weight | time (min) after which polymer sticks to roll | clarity 2 mm thick PVC-slice |
|---|---|---|---|
| product D (according to invention) | 0,5 | 25 | good |

EXAMPLE III

In this example the results are given of tests on a number of ethylene glycol esters of branched monocarboxylic acids derived from hexene, octene, decene and dodecene.

The formulation of the PVC used was as follows:

| | parts by weight |
|---|---|
| PVC-suspension polymer | 100 |
| di($\beta$-carbobutoxyethyl)tin bisiso octylthioglycolate | 2 |
| lubricant | 0,3–1,0 |

Each formulation was intensively mixed on a Papenmeier mixer. Part of the mixture was used for testing in the Brabender Plasticorder under the following conditions:

| temperature | 160° C. |
|---|---|
| speed | 30 revolutions per minute |
| sample weight | 32,5 g |
| pressure | 5 kg |

Clarity

To determine the influence of the lubricant on the clarity of the stabilized formulations 3 mm thick sheets had been pressed at 190° C. Samples of the gelation experiments were taken 10 minutes after gelation. The transmission of these sheets was measured with a Bausch and Lomb spectrophotometer. The transmission at 690 nm was used as a measure of the clarity of the sheet.

The product distribution of the mixtures used is given in the table below. A mixture of telomeric acids based on octene is referred to as TP8, TP standing for total product, i.e. the mixture of telomeric acids as it is obtained without the n=1 fraction having been removed. The TP-products based on hexene (TP6), octene (TP8), decene (TP10) and dodecene (TP12) always have practically the same composition:

| | wt % |
|---|---|
| n = 1 | 30–40 |
| n = 2 | 15–20 |
| n = 3 | 20–25 |
| n = 4 | 12–15 |
| n = 5 | 8–10 |
| n $\geq$ 6 | 4–6 |

Subjecting the TP fractions to distillation leads to a pure n=1 fraction along with an LTA (low telomeric acid fraction) and an HTA (heavy telomeric acid fraction). The weight distribution of these fractions is given in the table below.

| telomeric acid fraction | wt % | | | | | |
|---|---|---|---|---|---|---|
| | LTA 6 | LTA 8 | LTA 10 | HTA 6 | HTA 8 | HTA 10 |
| n = 1 | <5 | <5 | <5 | <5 | <5 | <5 |
| 2 | >60 | >70 | >80 | 10 | 20 | 30 |
| 3 | <35 | <25 | <15 | 25 | 30 | 35 |
| 4 | | | | 25 | 20 | 15 |
| 5 | | | | 25 | 15 | 10 |
| 6 | | | | 10 | 10 | 5 |

The following table gives the results of the Brabender gelation tests and the clarity tests on ethylene glycol esters from the above-mentioned mixtures of telomeric acids.

| ester of ethylene glycol and | phr* | Brabender gelation tests | | | | | clarity of 3mm thick pressed sheet at 690 nm % T |
|---|---|---|---|---|---|---|---|
| | | gelation time (min.) | fusion torque (m grams) | torque 10 min. after gelation (m grams) | temp at fusion °C. | temp. after 10 min °C. | |
| HTA$_6$ | 0,5 | 2,5 | 2600 | 2900 | 160 | 171 | 88 |
| | 0,68 | 3,0 | 2575 | 2900 | 159 | 170 | 87 |
| | 1,0 | 4,0 | 2450 | 2850 | 159 | 170 | 88 |
| TP$_8$ | 0,5 | 3,0 | 2500 | 2850 | 160 | 170 | 87 |
| | 0,68 | 3,1 | 2500 | 2900 | 158 | 169 | 88 |
| | 1,0 | 5,1 | 2500 | 2900 | 159 | 169 | 87 |
| TP$_{12}$ | 0,5 | 4,1 | 2500 | 2850 | 161 | 171 | 87 |
| | 0,68 | 5,5 | 2400 | 2850 | 160 | 169 | 67 |
| | 1,0 | 21,2 | 2500 | 2850 | 164 | 171 | 36 |
| HTA$_8$ | 0,5 | 2,4 | 2625 | 3000 | 154 | 168 | 81 |
| | 0,75 | 3,4 | 2550 | 2950 | 155 | 168 | 80 |
| | 1,0 | 8,6 | 2650 | 2950 | 159 | 168 | 71 |
| HTA$_{10}$ | 0,3 | 3,3 | 2575 | 2925 | 155 | 167 | 83 |
| | 0,5 | 7,5 | 2575 | 2950 | 158 | 167 | 61 |
| | 0,6 | 12,1 | 2450 | 2800 | 165 | 170 | 44 |
| | 0,75 | ±24 | 2600 | 2900 | 164 | 167 | 28 |
| ethylene glycol ester of montanic acid | 0,3 | 2,7 | 2600 | 2950 | 150 | 169 | 83 |
| | 0,5 | 6,3 | 2575 | 2900 | 163 | 171 | 69 |
| | 0,75 | 21,8 | 2600 | 2900 | 165 | 170 | 41 |
| control | 0 | 1,2 | 2700 | 2850 | 156 | 171 | 85 |

*phr = parts per hundred resin

From the above table it is evident that the external effect of the liquid ethylene glycol esters according to the invention increases with increasing length of the olefin from which the mixture of telomeric acids is derived.

EXAMPLE IV

In this example it is demonstrated that also esters derived from the HTA$_8$ described in Example III. an epoxide from an α-olefin having 15 to 18 carbon atoms and a straight-chain carboxylic acid such as lauric acid are very suitable to be used as a lubricant in PVC. Also tested as lubricant were the diester of ethylene oxide, HTA$_{10}$ and stearic acid, the diester of propylene oxide, HTA$_{10}$ and n-heptanoic acid, the diester of epoxidized 2-ethylhexyl oleate, HTA$_{10}$ and lauric acid and the diester of epoxidized 2-ethylhexyl oleate and the anhydride of TP$_{10}$. The formulation of the PVC used was entirely identical with the one of Example III.

The results are given in the table below.

| type of lubricant ester derived from: | phr | Brabender gelation tests | | | | | clarity of 3 mm thick pressed sheet at 690 nm % T |
|---|---|---|---|---|---|---|---|
| | | gelation time (min.) | fusion torque (m. grams) | torque 10 min. after gelation (m. grams) | temp at fusion (°C.) | temp. after 10 min (°C.) | |
| C$_{15}$—C$_{18}$ epoxide HTA$_8$ and lauric acid | 0,3 | 4,5 | 2500 | 2775 | 162 | 170 | 84 |
| | 0,5 | 8,4 | 2450 | 2800 | 161 | 169 | 63 |
| | 0,6 | 11,1 | 2450 | 2800 | 164 | 171 | 54 |
| ethylene oxide, HTA$_{10}$ and stearic acid | 0,3 | 3,8 | 2450 | 2825 | 162 | 171 | 81 |
| | 0,5 | 6,5 | 2500 | 2850 | 162 | 169 | 73 |
| | 0,6 | 10,2 | 2500 | 2775 | 165 | 170 | 57 |
| propylene oxide HTA$_{10}$ and n-heptanoic acid | 0,3 | 3,9 | 2500 | 2850 | 160 | 169 | 83 |
| | 0,5 | 9,4 | 2525 | 2825 | 163 | 169 | 63 |
| epoxidized 2-ethylhexyl oleate, HTA$_{10}$ and lauric acid | 0,3 | 2,4 | 2600 | 2850 | 158 | 169 | 86 |
| | 0,5 | 3,1 | 2500 | 2875 | 159 | 169 | 83 |
| epoxidized 2-ethylhexyl oleate and the anhydride of TP$_{10}$ | 0,3 | 2,4 | 2600 | 2900 | 156 | 171 | 83 |
| | 0,5 | 5,7 | 2500 | 2900 | 163 | 171 | 70 |

EXAMPLE V

In this example it is shown that also the esters of trimethylol propane and telomeric acids are excellently suitable to be used as lubricants in PVC. The formulation of the PVC used was again the same as the one used in Example III. The results are summarized in the table below

| trimethylol propane and: | phr* | Brabender gelation tests | | | | | clarity of 3mm thick pressed sheet at 690 nm % T |
|---|---|---|---|---|---|---|---|
| | | gelation time (min.) | fusion torque (m grams) | torque 10 min. after gelation (m grams) | temp at fusion °C. | temp. after 10 min °C. | |
| $TP_{12}$ | 0,3 | 3,0 | 2450 | 2900 | 159 | 170 | 85 |
| | 0,5 | 6,6 | 2500 | 2850 | 163 | 170 | 66 |
| | 0,68 | 11,9 | 2450 | 2850 | 163 | 170 | 50 |
| $HTA_6$ | 0,5 | 3,2 | 2550 | 2875 | 161 | 171 | 87 |
| | 0,68 | 3,3 | 2450 | 2850 | 160 | 170 | 87 |
| | 1,0 | 6,5 | 2475 | 2850 | 163 | 170 | 87 |
| $HTA_8$ | 0,3 | 3,3 | 2500 | 2950 | 154 | 167 | 78 |
| | 0,5 | 6,5 | 2500 | 2900 | 157 | 167 | 69 |
| | 0,6 | 10,2 | 2475 | 2850 | 164 | 170 | 54 |
| $HTA_{10}$ | 0,1 | 2,8 | 2600 | 2850 | 160 | 170 | 88 |
| | 0,3 | 6,8 | 2500 | 2850 | 163 | 170 | 67 |
| | 0,5 | 16,0 | 2500 | 2850 | 167 | 171 | 50 |

EXAMPLE VI

For the preparation of branched-chain acids use was made of a commercially available starting mixture of olefins consisting of about 22% by weight of olefins having not more than 28 carbon atoms and about 78% by weight of olefins having at least 30 carbon atoms ($C_{30+}$ olefins), about 66% by weight of the olefins being α-olefins. The remaining olefin compounds were vinylidene compounds. The reaction was carried out in a stirred (700 r.p.m.) reactor provided with 8 baffles and equipped with a stirrer having 6 diametrically opposed blades. Into this reaction vessel there were charged 12,5 liters (132 moles) of acetic anhydride. The liquid was heated to 120° C. while nitrogen was slowly passed through to remove the oxygen present in it. With the liquid being kept at 120° C., first of all the $C_{30+}$ olefin mixture was added. Of this mixture in all 1175 g (2,5 moles) were added over a period of 210 minutes. 12 minutes after a start had been made with adding olefin a slurry of 0,625 moles Mn (III) acetate in 2,5 l acetic anhydride was added over a period of 216 minutes (so for a period of 18 minutes after the last of the olefin had been added addition of Mn (III) acetate was continued to ensure complete conversion of the olefin).

The mixture was subsequently filtered to remove the Mn (II) acetate that had formed. Next, acetic anhydride and the acetic acid formed were removed by distillation. To the residue there were added 2,5 l acetic acid and 0,3 l water. With vigorous stirring the mixture was boiled with refluxing to hydrolyse the obtained anhydrides. Finally, the water-acetic acid layer was separated off, the product washed 3 times with hot water and dried.

The resulting mixture of straight-chain and branched-chain acids had an acid number of 86 and was esterified under an atmosphere of nitrogen with equivalent amounts of suitable alcohols.

In the esterification with ethylene glycol the following procedure was used.

To 300 grammes of the above-described mixture of melted acids there were added 1,05 equivalents of ethylene glycol and 0,6 grammes of zinc acetate. The mixture was stirred at 190° C. and the water evolved was carried off by a nitrogen stream. After 5 hours the remaining water and alcohol were removed under reduced pressure (14 mm Hg).

A similar procedure was used for the preparation of the ethylene glycol ester of a $C_{22-26+}$-acid. Further a mixture was prepared of the ethylene glycol ester of a $C_{30+}$ acid and the calcium soap thereof.

The resulting products were tested in a PVC formulation of the following composition.

| PVC-suspension polymer | 100 |
|---|---|
| Tribasic lead sulphate | 2 |
| Lubricant | 0,1–0,5 |

Each formulation was intensively mixed on a Papenmeier mixer. Part of the mixture was tested in the Brabender plasticorder under the following conditions:

| temperature | 170° C. |
|---|---|
| speed | 30 revolutions per minute |
| sample weight | 33,5 g |
| pressure | 5 kg |

| Lubricant | concentration | gelation time (min.) | fusion torque (m grams) | temperature at fusion (°C.) | torque 10 min. after gelation (m grams) | temperature 10 min. after gelation (°C.) |
|---|---|---|---|---|---|---|
| ethylene glycol ester $C_{30+}$ acid | 0,1 | 3,4 | 2400 | 164 | 2600 | 175 |
| | 0,3 | 9,2 | 2200 | 165 | 2500 | 174 |
| | 0,5 | >20 | — | — | — | — |
| ethylene glycol $C_{22-26+}$ acid | 0,1 | <1 | — | — | 2600 | 173 |
| | 0,3 | 3,1 | 2200 | 162 | 2625 | 174 |
| | 0,5 | 4,0 | 2300 | 165 | 2600 | 174 |
| Ca-soap of $C_{30+}$ acid | 0,1 | 2,3 | 2300 | 160 | 2400 | 174 |
| | 0,3 | 14,8 | 2200 | 168 | 2300 | 173 |

|  |  | -continued | | | | |
|---|---|---|---|---|---|---|
| Lubricant | concentration | gelation time (min.) | fusion torque (m grams) | temperature at fusion (°C.) | torque 10 min. after gelation (m grams) | temperature 10 min. after gelation (°C.) |
| 60% ethylene glycol ester $C_{30+}$ acid + 40% Ca-soap $C_{30+}$ acid | 0,5 | >20 | — | — | — | — |
| | 0,1 | 2,0 | 2150 | 160 | 2500 | 173 |
| | 0,3 | 11,0 | 2100 | 170 | 2200 | 173 |
| | 0,5 | >20 | — | — | — | — |
| ethylene glycol ester of montanic acid | 0,1 | 2,2 | 2250 | 163 | 2500 | 175 |
| | 0,3 | 3,7 | 2300 | 165 | 2550 | 175 |
| | 0,5 | 5,8 | 2200 | 170 | 2400 | 175 |

In the above table it is clearly demonstrated that the above compounds according to the invention display an excellent external lubricating effect in a lead-stabilized system.

EXAMPLE VII tions. The PVC formulation used was again identical with the one of Example III.

The results are given in the table below. They clearly show that the external effect of the lubricant improves with increasing chain length of the olefin from which the mixture of telomeric acids is built up.

| mixture of telomeric acids | phr | Brabender gelation tests | | | | | clarity of 3 mm thick pressed sheet at 690 nm % T |
|---|---|---|---|---|---|---|---|
| | | gelation time (min.) | fusion torque (m grams) | torque 10 min. after gelation | temp at fusion (°C.) | temp. after 10 min. °C. | |
| $ETA_6$ | 0,3 | 3,5 | 2600 | 2900 | 159 | 170 | 87 |
| | 0,5 | 6,8 | 2575 | 2875 | 162 | 171 | 84 |
| | 0,68 | 10,9 | 2300 | 2850 | 163 | 169 | 46 |
| $HTA_8$ | 0,3 | 3,5 | 2600 | 2950 | 150 | 169 | 85 |
| | 0,5 | 7,4 | 2500 | 2950 | 159 | 169 | 81 |
| | 0,6 | 14,8 | 2475 | 2950 | 159 | 168 | 59 |
| $HTA_{10}$ | 0,1 | 2,1 | 2600 | 2900 | 157 | 170 | 86 |
| | 0,3 | 5,7 | 2400 | 2850 | 162 | 171 | 77 |
| | 0,5 | 15,6 | 2350 | 2800 | 164 | 170 | 34 |

In this example it is demonstrated that both esters and amides derived from telomeric acids of a $C_{30+}$ olefin mixture and a $C_{22-26}$ olefin mixture display an excellent external effect. The same PVC-formulation was used as indicated in Example III. The results are given in the table below.

EXAMPLE VIII

In this example the results are given on a number of telomeric acid derivatives showing a different product distribution from a $TP_{12}$ acid, a $TP_{10}$ acid, a $HTA_{10}$ acid and a $C_{22-26}$ acid. The weight distribution of these acid

| type of lubricant | phr | Brabender gelation tests | | | | | clarity of 3 mm thick pressed sheet at 690 nm % T |
|---|---|---|---|---|---|---|---|
| | | gelation time (min.) | fusion torque (m. grams) | torque 10 min. after gelation (m. grams) | temp. at fusion (°C.) | temp. after 10 min (°C.) | |
| diester of polyethyleneoxide glycol (mol. weight 1000) and $C_{30+}$ acid. | 0,3 | 3,9 | 2600 | 2900 | 162 | 171 | 80 |
| | 0,5 | 8,1 | 2600 | 2900 | 163 | 170 | 63 |
| diamide of hexamethylene diamine and $C_{30+}$ acid | 0,3 | 8,9 | 2600 | 2850 | 165 | 171 | 64 |
| | 0,5 | 12,7 | 2575 | 2825 | 167 | 171 | 33 |
| diamide of difenyl-* diamine methane and $C_{30+}$ acid | 0,3 | 5,0 | 2600 | 2850 | 162 | 171 | 80 |
| | 0,5 | 8,9 | 2600 | 2900 | 165 | 171 | 75 |
| diester of 4,4'-isopropylidene diphenoxydiethanol and $C_{22-26+}$ acid | 0,3 | 2,2 | 2575 | 2900 | 155 | 169 | 75 |
| | 0,5 | 3,3 | 2500 | 2900 | 159 | 169 | 71 |

*prepared from diphenylmethane-4,4'-diisocyanate (MDI)

EXAMPLE VII

In this example it is demonstrated that also the mixtures of telomeric acids described in Example III are very suitable to be used as lubricant in resin composimixtures is given in example III. The formulation of the PVC used was entirely identical with the one in Example III.

The results are summarized in the table below.

| concentration lubricant 0,5 phr | Brabender gelation tests | | | | | clarity of 3 mm thick pressed sheet at 690 nm % T |
|---|---|---|---|---|---|---|
| | gelation time (min.) | fusion, torque (m grams) | temperature at fusion (°C.) | torque 10 min. after gelation (m grams) | temperature 10 min. after gelation (°C.) | |
| TP$_{12}$ and polyethylene oxide glycol (M.W. 200) | 3,7 | 2600 | 158 | 2850 | 169 | 82 |
| TP$_{10}$ and 4,4'-isopropylidene diphenol | 2,3 | 2600 | 156 | 2900 | 170 | 83 |
| HTA$_{10}$ and 4,4'-isopropylidene diphenol | 6,7 | 2525 | 162 | 2975 | 170 | 80 |
| amide of TP$_{10}$ and ethanolamine | 1,9 | 2600 | 157 | 2900 | 170 | 90 |
| amide of TP$_{10}$ stearylamine | 2,2 | 2600 | 158 | 2900 | 169 | 86 |
| diester of C$_{22-26}$ acid and 4,4'-isopropylidene diphenol | 2,4 | 2600 | 160 | 2900 | 170 | 89 |
| glycerol mono* oleate | 2,1 | 2600 | 160 | 2850 | 171 | 85 |
| n-butyl stearate | 2,3 | 2500 | 158 | 2850 | 171 | 85 |

*commercial products

We claim:

1. A resin composition having improved internal and external lubricating properties, comprising polyvinyl chloride or a copolymer thereof and 0,1 to 5% by weight, calculated on the polymer, of one or more acids and/or derivatives thereof selected from the group consisting of
   (a) esters of phenols or aromatic, aliphatic or cycloaliphatic alcohols having at least 1 to 10 primary or secondary hydroxyl groups;
   (b) amides of aliphatic, cycloaliphatic or aromatic mono- or diamines having 1 or 2 primary or secondary amino groups;
   (c) salts of alkali metals or alkaline earth metals, amphoteric metals, heavy metals, of ammonium or of a compound containing a tertiary amino group, characterized in that at least 40 percent by weight of the acid present as such, or at least 40 percent by weight of the acid from which the derivatives are prepared, has a branched-chain structure, and that at least 10 percent by weight thereof corresponds to the formula:

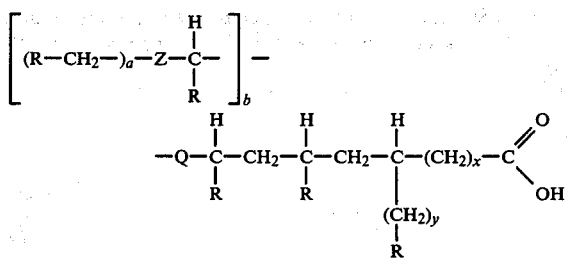

where
x=0, if y=2 or x=2, if y=0;
R=CH$_3$(CH$_2$)$_n$, where n represents an integer of from 3 to 42;
b=0 or 1, where
if b=0, Q represents a hydrogen atom, and
if b=1, Q represents a CH$_2$-group, and
a=0 or 1, where
if a=0, Z represents a hydrogen atom, and
if a=1, Z represents a CH$_2$-group.

2. A resin composition according to claim 1, characterized in that n represents an integer from 3 to 17.

3. A resin composition according to claim 2, characterized in that at least 30 percent by weight of the acid present as such, or at least 30 percent by weight of the acid from which the derivatives are prepared, corresponds to the formula

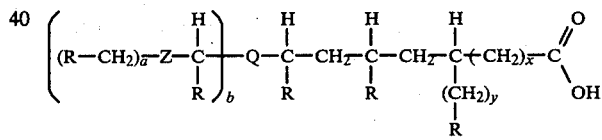

4. A resin composition according to claim 1, characterized in that n represents an integer from 17 to 42.

5. A resin composition according to claim 1, characterized in that the esters are derived from an aliphatic alcohol having 1 to 18 carbon atoms.

6. A resin composition according to claim 1, characterized in that the esters are derived from a branched aliphatic polyalcohol having 2 to 12 carbon atoms and 2 to 8 primary or secondary hydroxyl groups.

7. A resin composition according to claim 6, characterized in that the esters are derived from ethylene glycol, neopentyl glycol, trimethylol propane, pentaerythritol, dipentaerythritol, tripentaerythritol, glycerol and/or di-, tri- and/or tetraglycerol.

8. A resin composition according to claim 1, characterized in that besides the branched acids or derivatives thereof having the formula given in claim 1, there is present an acid or a derivative thereof with the acid having the formula:

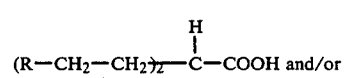

-continued

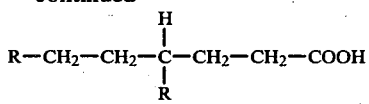

where R has the meaning given in claim 1.

9. A resin composition according to claim 8, characterized in that the percentage by weight of the acid present as such and having the formula according to claim 8, or the percentage by weight of the derivative of the acid having the same formula is about 15 to 70 percent by weight of the sum of the amount of branched-chain acids present as such having the formula

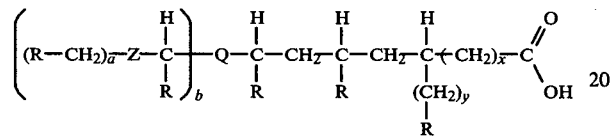

10. A resin composition according to claim 4 characterized in that besides the branched-chain acids or derivatives thereof having the formula

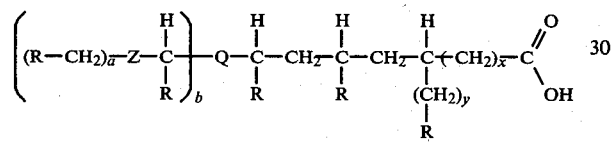

there is present an amount of 40 to 60 percent by weight of linear aliphatic monocarboxylic acids or derivatives thereof, with the acid having the formula: $RCH_2CH_2CH_2COOH$, where R represents a $CH_3(CH_2)_n$ group, and about 30 to 40 percent by weight of y-branched carboxylic acids or derivatives thereof, with the acid having the formula:

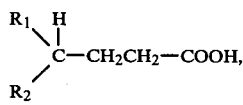

where $R_1$ and $R_2$ represent linear alkyl groups which together have the same number of carbon atoms as the group R.

11. A resin composition according to the claim 8 characterized in that besides the branched-chain acids or derivatives thereof having the formula:

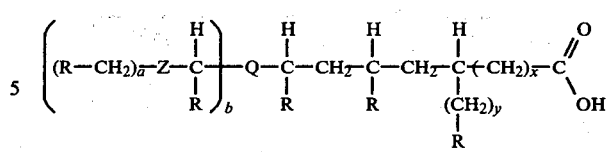

there is present an amount of 40 to 60 percent by weight of linear aliphatic monocarboxylic acids or derivatives thereof, with the acid having the formula: $RCH_2CH_2CH_2COOH$, where R represents a $CH_3(CH_2)_n$ group, wherein n represents an integer from 17 to 42, and about 30 to 40 percent by weight of y-branched carboxylic acids or derivatives thereof, with the acids having the formula:

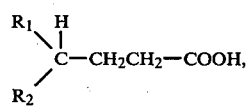

where $R_1$ and $R_2$ represent linear alkyl groups which together have the same number of carbon atoms as the group R.

12. A resin composition according to the claim 9 characterized in that besides the branched-chain acids or derivatives thereof having the formula:

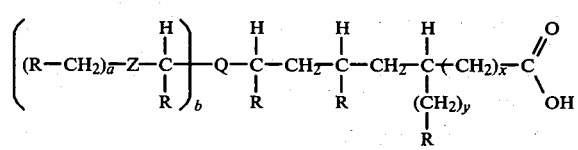

there is present an amount of 40 to 60 percent by weight of linear aliphatic monocarboxylic acids or derivatives thereof, with the acid having the formula: $RCH_2CH_2CH_2COOH$, where R represents a $CH_3(CH_2)_n$ group, wherein n represents an integer from 17 to 42, and about 30 to 40 percent by weight of y-branched carboxylic acids or derivatives thereof, with the acids having the formula:

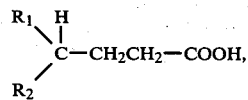

where $R_1$ and $R_2$ represent linear alkyl groups which together have the same number of carbon atoms as the group R.

* * * * *